US006885493B2

(12) United States Patent
Ljungblad et al.

(10) Patent No.: US 6,885,493 B2
(45) Date of Patent: Apr. 26, 2005

(54) METHOD AND A DEVICE FOR REDUCING HYSTERESIS OR IMPRINTING IN A MOVABLE MICRO-ELEMENT

(75) Inventors: Ulric Ljungblad, Mölndal (SE); Hubert Karl Lakner, Grossroehrsdorf (DE); Peter Dürr, Dresden (DE)

(73) Assignee: Micronic Lasersystems AB, Taby (SE)

( * ) Notice: Subject to any disclaimer, the term of this patent is extended or adjusted under 35 U.S.C. 154(b) by 0 days.

(21) Appl. No.: 10/467,184
(22) PCT Filed: Jan. 28, 2002
(86) PCT No.: PCT/SE02/00142
§ 371 (c)(1),
(2), (4) Date: Aug. 5, 2003
(87) PCT Pub. No.: WO02/063371
PCT Pub. Date: Aug. 15, 2002

(65) Prior Publication Data
US 2004/0150868 A1 Aug. 5, 2004

(30) Foreign Application Priority Data
Feb. 5, 2001 (SE) .............................................. 0100336

(51) Int. Cl.$^7$ .............................................. G02B 26/00
(52) U.S. Cl. ........................ 359/290; 359/292; 359/295
(58) Field of Search ................................ 359/290, 291, 359/292, 295, 298; 438/469

(56) References Cited

U.S. PATENT DOCUMENTS

| 5,096,279 A | * | 3/1992 | Hornbeck et al. .......... 359/230 |
| 5,382,961 A | | 1/1995 | Gale, Jr. |
| 5,444,566 A | | 8/1995 | Gale et al. |
| 5,508,841 A | * | 4/1996 | Lin et al. .................... 359/318 |
| 5,526,688 A | * | 6/1996 | Boysel et al. ............. 73/514.38 |
| 5,629,794 A | * | 5/1997 | Magel et al. ................ 359/290 |
| 5,650,881 A | * | 7/1997 | Hornbeck .................... 359/871 |
| 5,706,123 A | * | 1/1998 | Miller et al. ................. 359/291 |
| 5,768,007 A | | 6/1998 | Knipe et al. |
| 5,912,758 A | | 6/1999 | Knipe et al. |
| 6,084,235 A | | 7/2000 | Breithaupt et al. |
| 6,195,196 B1 | | 2/2001 | Kimura et al. |
| 6,285,490 B1 | * | 9/2001 | Meier et al. ................. 359/291 |

FOREIGN PATENT DOCUMENTS

| EP | 0 463 348 A2 | 1/1992 |
| EP | 0 463 348 A3 | 10/1992 |
| WO | WO 99/67671 A1 | 12/1999 |
| WO | WO 03/079090 A1 | 9/2003 |
| WO | WO 03/079091 A1 | 9/2003 |

* cited by examiner

*Primary Examiner*—Hung Xuan Dang
*Assistant Examiner*—Tuyen Tra
(74) *Attorney, Agent, or Firm*—Ernest J. Beffel, Jr.; Haynes Beffel & Wolfeld LLP

(57) ABSTRACT

The present invention relates to a movable micro-element with reduced imprinting or hysteresis effect arranged spaced apart from a surface comprising at least one electrode. At least one restoring element is connected to said movable micro-element. An address electrode is arranged on said surface and capable to electrostatically attract said movable micro-element. Said address electrode is addressed to a first potential. Said movable micro-element is first set to a second potential defining a non addressed state and at a time period Δt before a predetermined pulsed signal is emitted said movable micro-element is switched from said second potential to a third potential defining an addressed state. Said movable micro-element is kept in said addressed state for a time period of Δt+Δt'. The invention also relates to a Spatial Light Modulator (SLM), an apparatus for patterning a workpiece and a method of reducing an imprinting or hysteresis effect of a movable micro-element.

56 Claims, 7 Drawing Sheets

|     | c1 | c2 | c3 | c4 | c5 | c6 | c7 | c8 |
| --- | --- | --- | --- | --- | --- | --- | --- | --- |
| l1  |    |    |    |    |    |    |    |    |
| l2  |    |    |    |    |    |    |    |    |
| l3  |    |    |    |    |    |    |    |    |
| l4  |    |    |    |    |    |    |    |    |
| l5  |    |    |    |    |    |    |    |    |
| l6  |    |    |    |    |    |    |    |    |
| l7  |    |    |    |    |    |    |    |    |
| l8  |    |    |    |    |    |    |    |    |

Fig. 5

METHOD AND A DEVICE FOR REDUCING HYSTERESIS OR IMPRINTING IN A MOVABLE MICRO-ELEMENT

TECHNICAL FIELD

The present invention relates in general to techniques for reducing hysteresis or imprinting effects in mechanical elements, and in particular to a movable micro-element and a method for addressing the same.

DESCRIPTION OF THE BACKGROUND ART

Hysteresis or imprinting of mirror deflection amplitude in Spatial Light Modulators (SLM), which leads to a shift in a required address voltage for a preferred mirror deflection, is a problem since it reduces the accuracy of the mirror deflection. This shift depends on an amount of time that the mirror has been deflected, an amplitude of the deflection and a time that the mirror has had to relax after said deflection. The time constants for these phenomena are in the region of minutes/hours making it virtually impossible to predict and compensate the required address voltages for an arbitrary pattern in a mask writer or a direct writer using a state of the art SLM technology.

A problem with a compensation for the imprinting is that the mirrors in the SLM are loaded with data row by row, always from the same direction. This means that with all mirrors in a fully deflected state the first row pixels will have a very high duty-cycle while in the last row they will have a very low duty-cycle and the intermediate rows will have intermediate duty-cycles. It is therefore also impossible, or at least very difficult, to use a collectively addressable pixel counter electrode as a balance for the imprinting effect unless the SLM is redesigned to load the data from the first and the last row every second time to average the duty-cycles. Even then the imprinting would still be pattern dependent and it would be necessary to often calibrate the mirrors or leave the system idle for a period of time to let the mirrors in the SLM relax.

Therefore, there is a need in the art for a method and an apparatus with reduced imprinting effect.

SUMMARY OF THE INVENTION

In view of the foregoing background, in the movable micro-elements and in the method for addressing individual movable micro-elements, such as for example mirror elements in a SLM, it is critical to reduce the imprinting effect.

Accordingly, it is an object of the present invention to provide an improved movable micro-element, which overcomes or at least reduces the above-mentioned problem.

In a first embodiment, the invention provides a movable micro-element with reduced imprinting effect or hysteresis effect arranged spaced apart from a surface comprising at least one electrode. At least one restoring element is connected to said movable micro-element. An address electrode is arranged on said surface and capable to electrostatically attract said movable micro-element. Said address electrode is addressed to a first potential. Said movable micro-element is first set to a second potential defining a non addressed state and at a time period $\Delta t$ before a predetermined pulsed signal is emitted said movable micro-element is switched from said second potential to a third potential defining an addressed state. Said movable micro-element being in said addressed state for a time period of $\Delta t + \Delta t'$.

In another embodiment of the invention said movable micro-element is switched back into said non addressed state after being in said addressed state by switching said third potential back to said to said second potential.

In another embodiment of the invention said movable micro-element is switched into an electrostatically unattracted state after being in said addressed state.

In another embodiment of the invention said predetermined pulsed signal is capable to clear out a potential difference between said address electrode and said movable micro-element and thereby restoring said movable micro-element to said electrostatically unattracted state.

In another embodiment of the invention said predetermined signal is an electromagnetic radiation signal directed onto said movable micro-element.

In another embodiment of the invention said predetermined signal is an electric signal which is capable to initiate a discharging of a capacitor connected to said address electrode and loaded with said first potential.

In another embodiment of the invention said time period $\Delta t + \Delta t'$ is shorter than 10 ms.

In another embodiment of the invention said time period $\Delta t + \Delta t'$ is shorter than 10 $\mu$s.

In another embodiment of the invention a value of said second potential is essentially equal to half a maximum potential addressed to said address electrode defining an undeflected state at both the maximum and a minimum potential addressed to said address electrode and said third potential is essentially equal to the minimum potential addressed to said address electrode.

In still another embodiment of the invention said movable micro-element is supported along a mid-section by a pair of torsional hinges defining a torsional axis.

In still another embodiment of the invention said movable micro-element is supported along its mid section by a pair of pivot elements defining a tilting axis and where said restoring element is at least one flexure hinge capable of restoring said movable micro-element in an undeflected state but at the same time permitting said movable micro-element to tilt around said tilting axis.

In still another embodiment, the invention further comprising at least one flexure hinge capable of restoring said movable micro-element in a undeflected position but at the same time permitting said movable micro-element to rotate around said tilting axis.

In still another embodiment of the invention said movable micro-element is supported along one of its mid sections by a pair of flexure hinges capable of restoring said movable microelement to a relaxed state but at the same time permitting said movable micro-element to make an orthogonal movement with respect to said surface comprising said at least one electrode.

In still another embodiment of the invention said movable micro-element is supported along two of its mid sections by two pairs of flexure hinges capable of restoring said movable microelement to a relaxed state but at the same time permitting said movable micro-element to make an orthogonal movement with respect to said surface comprising said at least one electrode.

In still another embodiment of the invention said flexure hinges are attached to the corners of a polygon.

In still another embodiment of the invention said flexure hinges are attached to the sides of a polygon.

In still another embodiment of the invention at least one of said flexure hinges and/or at least one of said torsional axis is meander shaped.

In still another embodiment of the invention said surface further comprising a counter electrode laterally spaced apart from said address electrode and where said address electrode and said counter electrode are capable to electrostatically attract said movable micro-element.

In still another embodiment of the invention said predetermined pulsed signal is capable to clear out a potential difference between said address electrode and said counter electrode and thereby restoring said movable micro-element to said non addressed state.

In still another embodiment of the invention said predetermined pulsed signal is capable to clear out a potential difference between said address electrode and said counter electrode and thereby restoring said movable micro-element to an electrostatically unattracted state.

In still another embodiment of the invention said predetermined signal is electromagnetic radiation directed onto said movable element.

In still another embodiment of the invention said predetermined signal is an electric signal capable of discharging a capacitor connected to said address electrode and loaded with said first potential.

In still another embodiment of the invention said predetermined pulsed signal is synchronized with said time period Dt+Dt' so that the time Dt is essentially equal to the pulse length of said predetermined signal.

The invention relates also to a spatial light modulator having a plurality of reflecting elements where said reflecting elements are movable micro-elements according to any one of the embodiments as described.

In another embodiment of the invention said reflecting elements are set to a potential via a common element pin.

In still another embodiment of the invention said counter electrodes are set to a potential via a common counter pin.

In still another embodiment of the invention all reflecting elements are in an addressed state for essentially the same period of time.

The invention relates also to an apparatus for patterning a workpiece arranged at an image plane and sensitive to electromagnetic radiation.

In a first embodiment, the invention provides a source emitting electromagnetic radiation directed onto an object plane. A computer controlled reticle comprising a plurality of reflecting movable micro-elements, adapted to receive said electromagnetic radiation at said object plane and to relay said electromagnetic radiation toward said work piece arranged said image plane, where said computer controlled reticle comprising a plurality of reflecting micro-elements characterized in that said reflecting micro-elements are movable micro-elements according to any one of the embodiments as described.

The invention relates also to a method of reducing an imprinting effect of a movable micro-element arranged spaced apart from a surface, where said surface comprises at least one electrode.

In a first embodiment, the invention comprising the actions of:
setting said movable micro-element to a second potential defining a non addressed state,
addressing an address electrode to a first potential, where address electrode is arranged on said surface and capable to electrostatically attract said movable micro-element,
switching said movable micro-element from said third potential to a fourth potential, defining an addressed state, at a time Dt before a predetermined pulsed signal is emitted,
keeping said movable micro-element in said addressed state for a time period of Dt+Dt'.

In another embodiment, the invention further comprising the action of:
switching said movable micro-element from said third potential back to said second potential thereby returning to said non addressed state.

In another embodiment, the invention further comprising the action of:
switching said movable micro-element into an electrostatically unattracted state after being in said addressed state.

In another embodiment, the invention further comprising the action of:
clearing out a potential difference between said address electrode and said movable micro-element by means of said predetermined pulsed signal and thereby restoring said movable micro-element to said electrostatically unattracted state.

In another embodiment of the invention said predetermined signal is an electromagnetic radiation signal directed onto said movable micro-element.

In another embodiment of the invention said predetermined signal is an electric signal capable to initiate a discharging of a capacitor connected to said address electrode and loaded with said first potential.

In another embodiment of the invention said time period $\Delta t+\Delta t'$ is shorter than 10 ms.

In another embodiment of the invention said time period $\Delta t+\Delta t'$ is shorter than 10 $\mu s$.

In another embodiment of the invention said second potential is essentially equal to half a maximum potential addressed to said address electrode defining an undeflected state at both the maximum and a minimum potential addressed to said address electrode and said third potential is essentially equal to said minimum potential addressed to said address electrode.

In still another embodiment, the invention further comprising the action of:
supporting said movable micro-element along a mid section by a pair of torsional hinges defining a torsional axis.

In still another embodiment, the invention further comprising the action of:
supporting said movable micro-element along its mid section by a pair of pivot elements defining a tilting axis and where said restoring element is at least one flexure hinge capable of restoring said movable micro-element in an undeflected state but at the same time permitting said movable micro-element to rotate around said tilting axis.

In still another embodiment, the invention further comprising the action of:
restoring said movable micro-element with at least one flexure hinge.

In still another embodiment, the invention further comprising the action of:
supporting said movable micro-element along one of its mid sections by a pair of flexure hinges which are capable of restoring said movable micro-element to a relaxed state but at the same time permitting said movable micro-element to make an orthogonal movement with respect to said surface comprising said at least one electrode.

In still another embodiment, the invention further comprising the action of:

supporting said movable micro-element along two mid sections by a pair of flexure hinges capable of restoring said movable micro-element to a relaxed state but at the same time permitting said movable micro-element to make an orthogonal movement with respect to said surface comprising said at least one electrode.

In another embodiment of the invention said flexure hinges are attached to the corners of a polygon.

In another embodiment of the invention said flexure hinges are attached to the sides of a polygon.

In still another embodiment, the invention further comprising the action of:

where at least one of said flexure hinges and/or at least one of said torsional axis is meander shaped.

In another embodiment of the invention said movable micro-element is a movable micro-element according to any one of the embodiments as described.

In still another embodiment, the invention further comprising the action of:

synchronizing said predetermined pulsed signal with said time period Δt+Δt' so that the time Δt' is essentially equal to the pulse length of said predetermined signal.

BRIEF DESCRIPTION OF THE DRAWINGS

For a more complete understanding of the present invention, and the advantages thereof, reference is now made to the following description taken in conjunction with the accompanying drawings, in which:

FIG. 5 illustrates the arrangement of SLM stamps on the workpiece.

DETAILED DESCRIPTION OF THE PREFERRED EMBODIMENTS

Figure 1D:
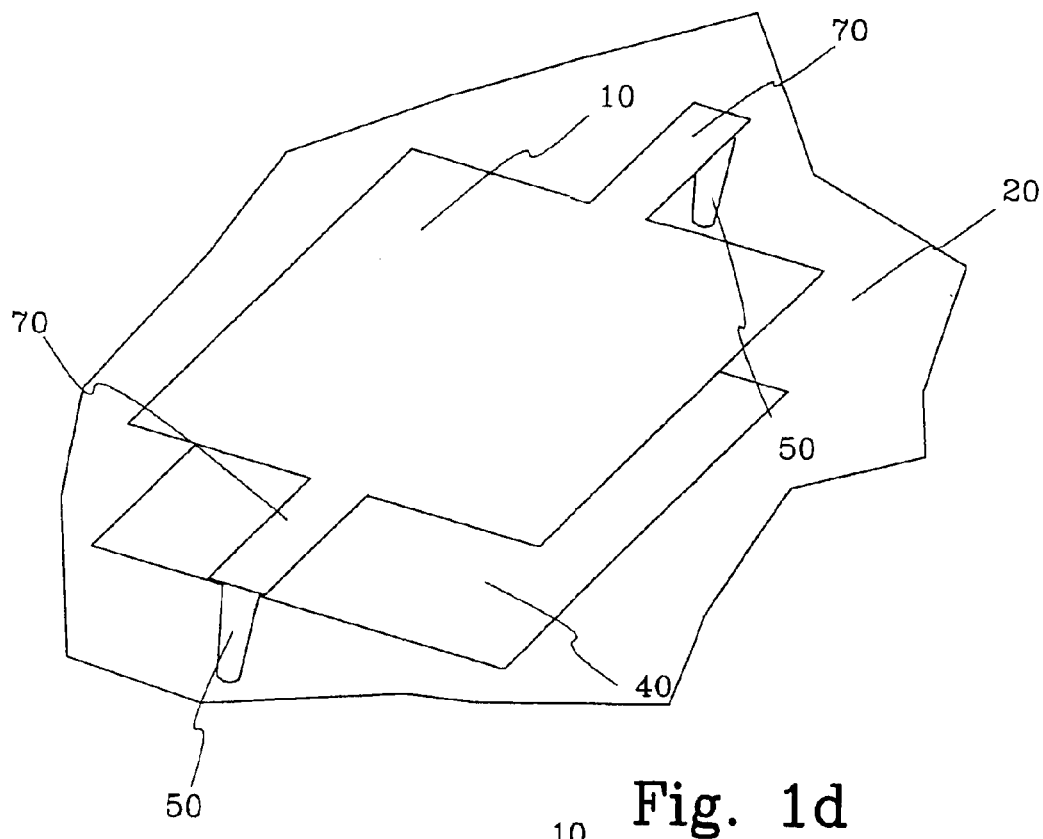
FIG. 1d shows a fourth embodiment of a movable micro-element with reduced imprinting effect according to the invention.
Figure 1A:
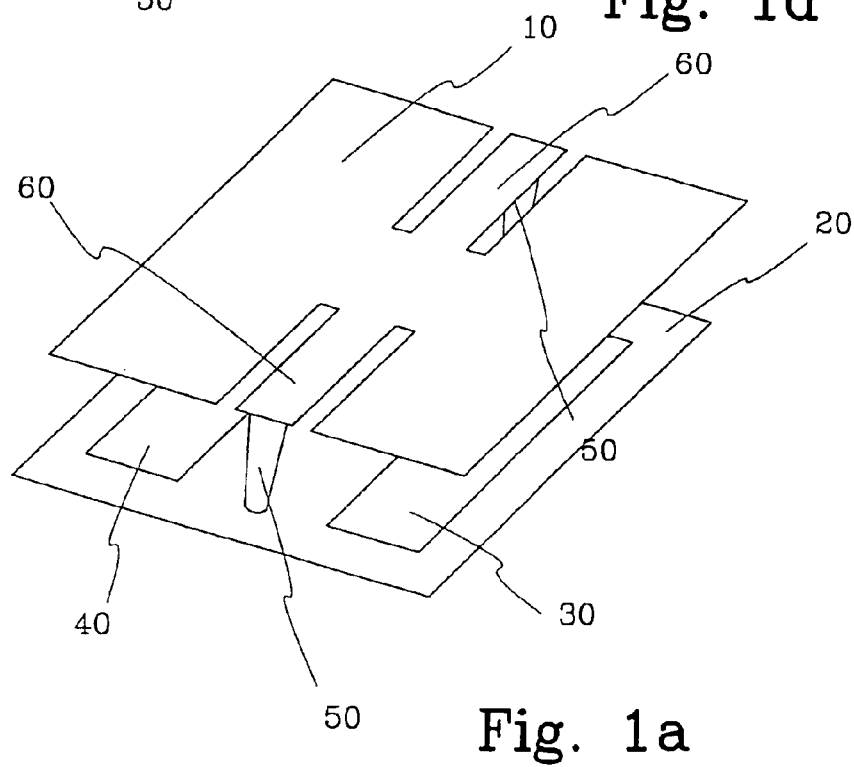
FIG. 1a shows a first embodiment of a movable micro-element with reduced imprinting effect according to the invention.

FIG. 1a shows a first embodiment of a movable micro-element, for example a micro mechanical element, with reduced imprinting effect according to the invention. Said movable micro-element may for example be a mirror in a Spatial Light Modulator (SLM). Said mirror may be operated in an analog mode to selectively steer the degree of deflection of said mirror element being a function of an electrical input or digital mode representing an ON and OFF state of the mirror element defined by maximum deflection and non deflection. The deflection of the mirror element may be generally linear or nonlinear, as a function of the input signal, depending on how said mirror (movable micro-element) is being mechanically affected.

In this embodiment the movable micro-element 10 is a generally rectangular reflective element supported along one its mid sections by a pair of torsion hinges 60. The reflective element may have any form for example polygonal, circular or elliptical. Said hinges define a torsional axis there along. Said torsion hinges, extends from the movable micro-element 10 and is supported by a support element 50. The support element is supported upon a substrate 20. The movable micro-element 10, the torsion hinge 60, the support element 50 and the substrate may be of the same material for example silicon or aluminum and they may be etched out of one substrate using well known etching techniques for a person skilled in the art and therefore does not need to be further described.

The substrate also comprises an electrically conducting address electrode 40 and an optional electrically conducting counter electrode 30. The address electrode 40 and the optional counter electrode 30 are connected to underlining address circuitry fabricated within the substrate 20 (not shown). The address electrodes are connected to capacitors, which store the address voltage addressed to said electrode. The optional counter electrode 30 and the address electrode 40 are laterally spaced apart on said surface 20 and capable to electrostatically attract said movable micro-element 10. The torsion hinge 60, rotate or twist with the movable micro-element 10 and provide restoring force in the form of mechanical energy. When no voltage is applied on the movable micro-element, the optional counter electrode 30 and the addressing electrode the movable micro-element is said to be in a normal flat or undeflected position which herein below will be referred to as an electrically unattracted state. By shifting the address voltage from said address electrode to the counter electrode said movable micro-element can by rotated in an opposite direction.

Figure 1E:
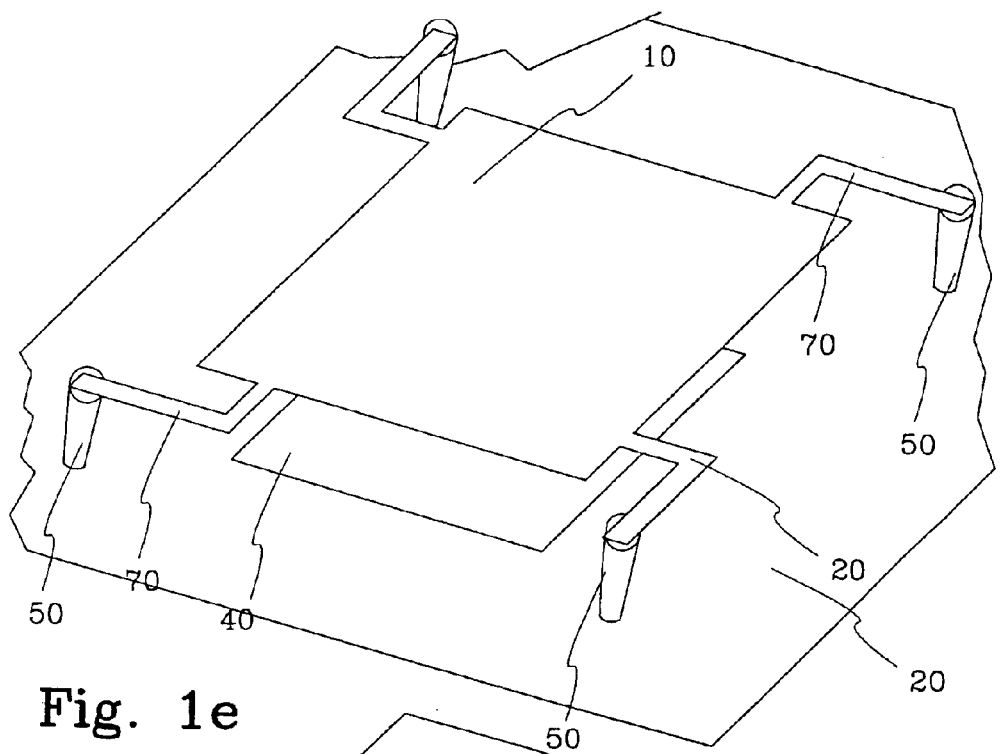
FIG. 1e shows a fifth embodiment of a movable micro-element with reduced imprinting effect according to the invention.
Figure 1B:
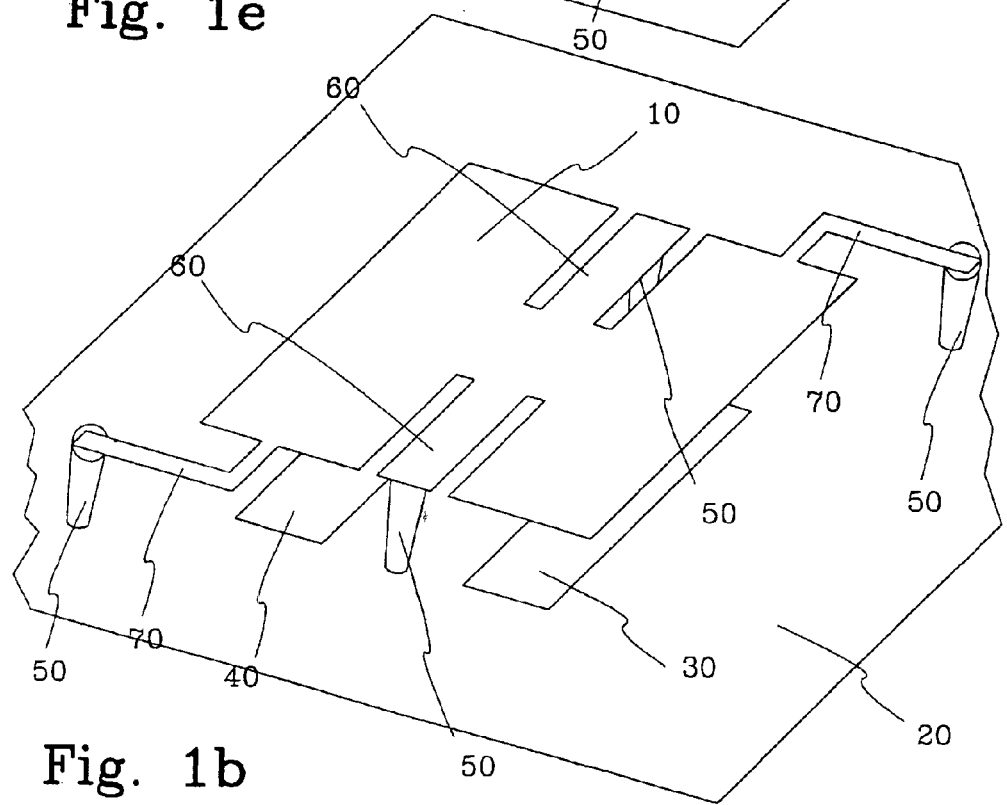
FIG. 1b shows a second embodiment of a movable micro-element with reduced imprinting effect according to the invention.

FIG. 1b shows a second embodiment of a movable micro-element with reduced imprinting effect according to the invention. This second embodiment comprises in addition to the first embodiment two flexible hinges 70 connected to the movable micro-element 10 and supported by a support elements 50. Said flexible hinges 70 also provide restoring forces, and deform or flex, when the movable micro-element 10 deflects about the torsional axis defined by the torsion hinges 60. In this embodiment the flexible hinges 70 are L-shaped with one of its ends connected to the support elements 50 and another end connected to the movable micro-element 10. One of the flexible hinges is connected at the same side as one of the torsional hinges and the other flexible hinge is connected at the same side as the other torsion hinge and the flexible hinges are diagonally spaced apart on the movable micro-element.

Figure 1C:
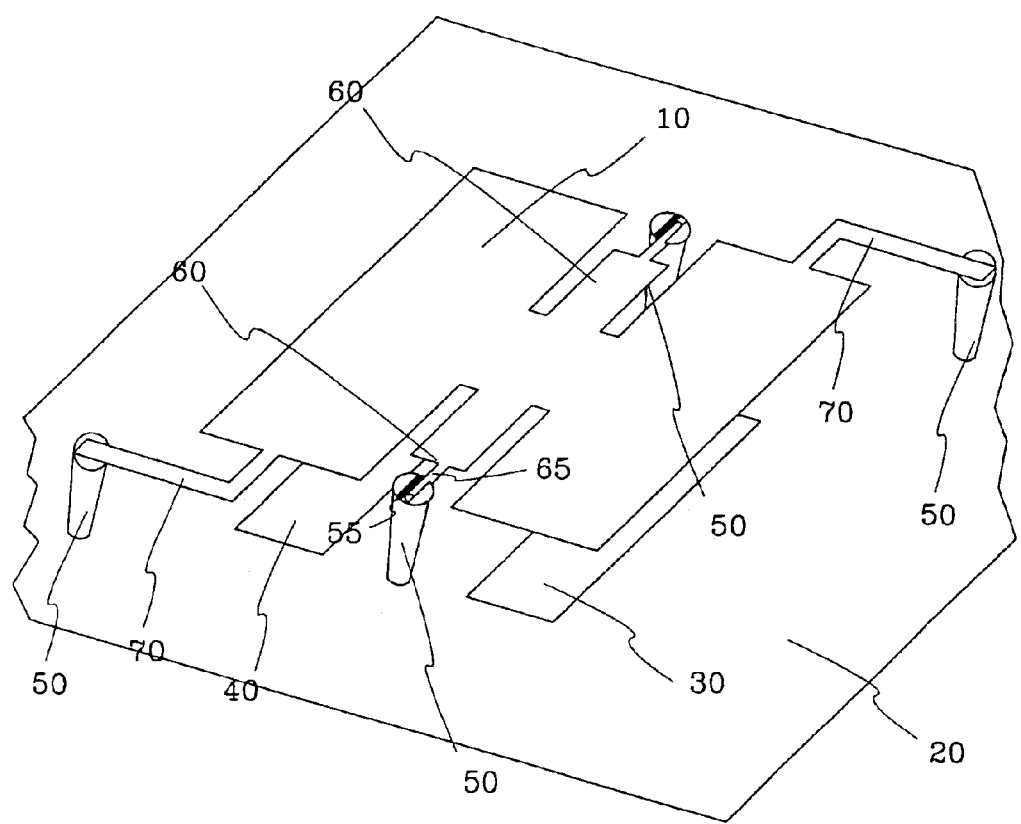
FIG. 1c shows a third embodiment of a movable micro-element with reduced imprinting effect according to the invention.

FIG. 1c shows a third embodiment of a movable micro-element with reduced imprinting effect according to the invention. This embodiment differs from the second embodiment in that the movable micro-element 10 comprises two pivots 65 instead of said torsion hinges 60. The pivots are supported by said support elements 50. Said pivots are lying in a recess 55 formed on top of said support 50 and adapted to the size of the pivot 65 in order to allow said movable micro-element 20 only to tilt around its tilting axis and not to move out sideways of its position.

Restoring forces are provided by flexible hinges 70 which deform or flex when the movable micro-element 10 deflects about the tilting axis defined by the pivots 60. In this embodiment the flexible hinges 70 are L-shaped with one of its ends connected to support elements 50 and another end connected to the movable micro-element 10. One of the flexible hinges is connected at the same side as one of the pivots and the other flexible hinge is connected at the same side as the other pivots and the flexible hinges are diagonally spaced apart on the movable micro-element.

FIG. 1d shows a fourth embodiment of a movable micro-element with reduced imprinting effect according to the invention. This fourth embodiment differs from the previous embodiments as described in connection with FIGS. 1–3 in that a movable micro-element 10 moves up and down in a direction perpendicular to a surface 20 on which at least one address electrode 40 is attached. Flexible hinges 70 are connected to the movable micro-element 10 and supported by support elements 50. Said flexible hinges 70 provide restoring forces, and deform or flex, when the movable micro-element 10 moves up and down in a direction essentially orthogonal to the surface 20. In this embodiment the flexible hinges 70 are rectangular with one of its ends connected to the support elements 50 and another end connected to the movable micro-element 10. The flexible hinges are attached to the rectangular movable micro-element on two opposite sides. Preferably said hinges coincide with one of the symmetry axis of said movable micro-element 10. In another embodiment at least another pair of flexible hinges 70 are attached to said movable micro-element 10 which coincide with another symmetry axis of said movable micro-element 10. In the embodiment in FIG. 1d the address electrode 40 is essentially of the same size and shape as the movable micro-element 10, alternatively both the shape and size of said address electrode 40 may be different to said movable micro-element 10. Said address electrode may also be split into a plurality of address electrodes 40. Destructive interference is achieved by shifting a movable micro-element 10 downwards (for one quarter of the wavelength used to impinge on said element) while another movable micro-element (in the same pixel) remains in a relaxed position (no electrostatically attraction force between the movable micro-element 10 and the address electrode 40).

FIG. 1e shows a fifth embodiment of a movable micro-element with reduced imprinting effect according to the invention. This fourth embodiment differs from the fourth embodiment in that the flexible hinges 70 are L-shaped, the number of flexible elements 70 is four instead of two and in that each pair of them coincides essentially with a diagonal symmetry axis.

Figure 2:
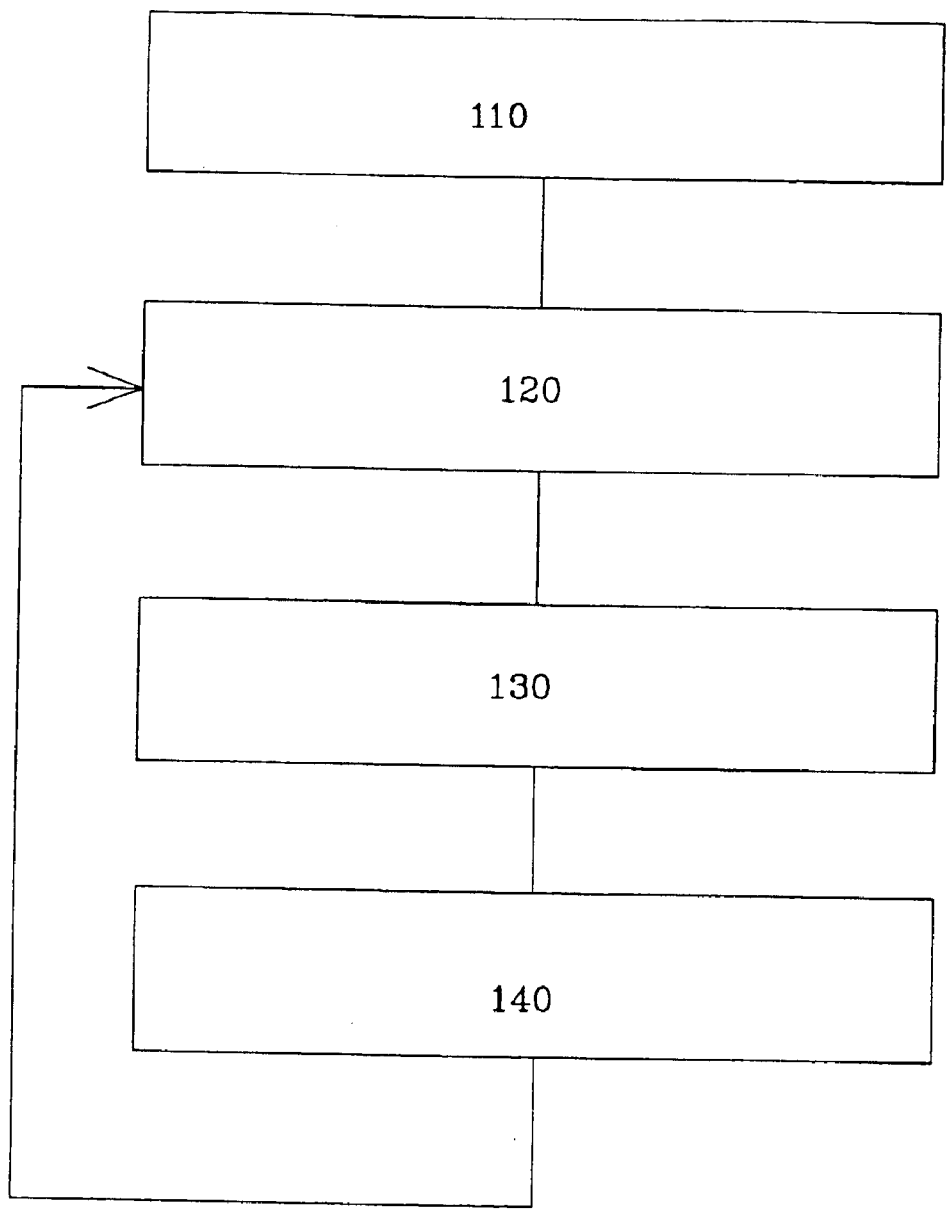
FIG. 2 shows a schematic flow diagram of the method of reducing an imprinting effect according to the invention.

FIG. 2 shows a schematic flow diagram of the method of reducing an imprinting effect according to the invention.

A first action 110 represents setting said movable micro-element 10 to a second potential. Said second potential may for example be a potential which is half the value of a maximum potential addressed to the address electrode. The third potential defining a non addressed state.

A second action 120 represents addressing an address electrode 40 to a first potential. Said first potential may be any value between a minimum potential and the maximum potential, where said minimum potential may a ground potential and said maximum potential may for example be 20 V. Said address electrode 40 is arranged on the surface 20 and capable to electrostatically attract said movable micro-element 10.

A third action 130 represents switching said movable micro-element from said second potential to a third potential, which defines an addressed state. The switching to said third potential takes place a time $\Delta t$ before a predetermined pulsed signal is emitted. The third potential may for example be ground.

A fourth action 140 represents keeping the movable micro-element in said addressed state for a time period equal to $\Delta t + \Delta t'$, which in one embodiment is shorter than 10 ms and in another embodiment shorter than 10 $\mu$s. $\Delta t'$ may for instance correspond to the time period for discharging a capacitor which will be a few $\mu$s or shorter depending of the type and size of the capacitor. $\Delta t$ can be set at any value in a sub second range, more preferably, approximately below 10 ms, and most preferably below 10 $\mu$s. $\Delta t$ is typically longer than $\Delta t'$ but the reverse may be applicable. The predetermined signal may for instance be a beam of a pulsed electromagnetical radiation such as for example a pulsed laser. $\Delta t'$ is in one embodiment synchronized with the pulse length of the pulsed signal.

After being in said addressed state for the time period of $\Delta t + \Delta t'$ the movable microelement is either switched back to the second potential or switched to an electrostatically unattracted state.

A Spatial Light Modulator may comprise a plurality of mirrors which may be of the type of movable micro-elements arranged in a one-dimensional row or a two dimensional array. In said SLM may all movable micro-element, i.e. mirror surfaces, be connected together to one voltage plane and it is possible to address this plane at one of the input pins, a so-called element pin. The same applies for all counter electrodes 30 on said substrate 20, i.e. they are jointly addressable using a so-called counter pin. When the counter electrode 30 is kept at the ground potential, the address electrode is addressed to ground potential and the movable micro-element is set either to the third or fourth potential the movable micro-element is not deflected since the potential difference between the address electrode and the movable micro-element is equal to the potential difference between the counter electrode and the movable micro-element. Depending on the thickness there may however be a small bending downwards in both edges of the movable micro-element. Said bending will increase with increased voltage applied on said movable micro-element for a constant thickness of the movable micro-element. All mirrors in the SLM are switched essentially at the same time from said third potential to said fourth potential, i.e. from said non addressed state to said addressed state. All mirrors in the SLM are also in said addressed state essentially the same period of time ($\Delta t + \Delta t'$) thereby eliminating or at least reducing the imprinting effect of the mirror elements. The shorter the time period the mirror elements are in the addressed state the less the mirror elements will be affected by the hysteresis effect (imprinting effect), i.e. a shorter duty-cycle, defined as the percentage of time the mirror elements are in an addressed state, will result in less affected mirror elements by said hysteresis effect. The mirror elements are not only in said addressed state for a short time but each and every mirror element are in said addressed state essentially the same time period namely $\Delta t + \Delta t'$.

Figure 3:
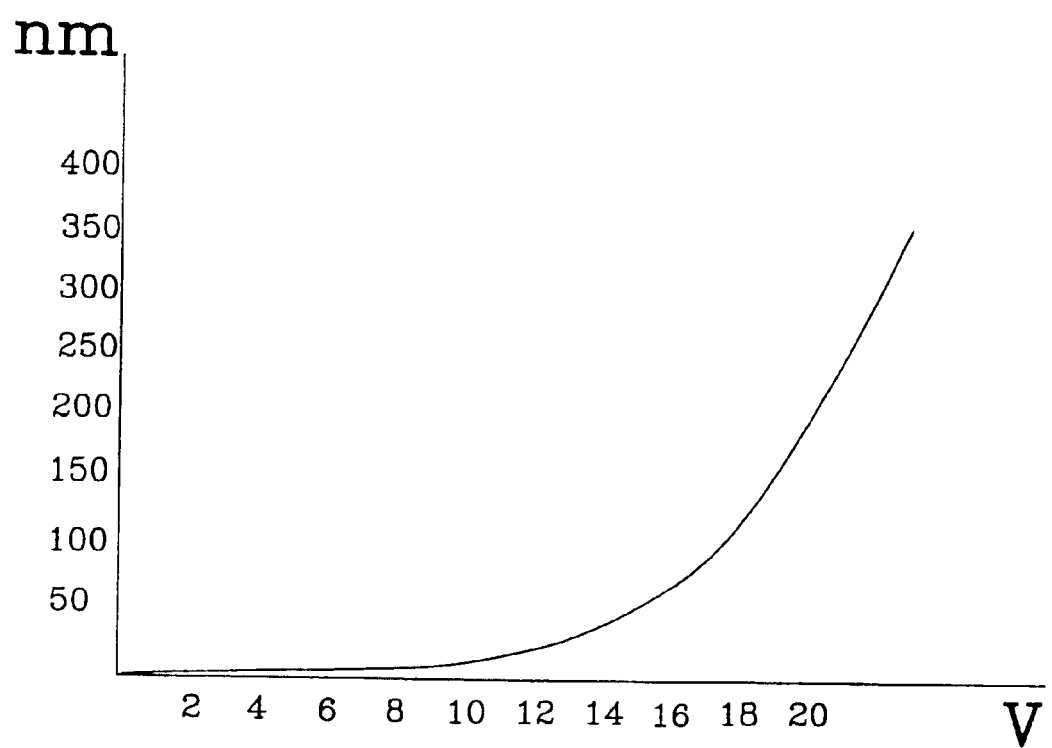
FIG. 3 shows a schematic diagram of the deflection as a function of potential difference between an address electrode and a movable micro-element.

If the movable micro-element is set at 10 V and the counter electrode is kept at ground potential the movable micro-element 10 will remain essentially undeflected both for the case that the address electrode is addressed to the minimum voltage 0 V and maximum voltage 20 V. This can be understood by realizing that the sign of the voltage is of no importance for the electrostatic force, it is always attractive. An example of the deflection as a function of the potential difference between the address electrode and the movable micro-element is shown in FIG. 3. In FIG. 3 the movable element is at zero potential and the potential on the address electrode is varying while measuring the degree of deflection alternative up and down movement. In this figure one can see that the movable micro-element is essentially undeflected below a certain potential difference, in this case 10 V. The electrostatic force between the movable micro-element and the address electrode is counteracted by the mechanical restoring force in the torsional hinge(s) 60 and/or the flexible hinge 70. Depending on the type and number of torsional hinges and/or flexible hinges attached to the movable micro-element said deflection as a function of the potential difference between the address electrode and the movable micro-element may change.

This means that it is possible to address all pixels, i.e. rotating elements, without essentially deflecting the corresponding rotating element using 10 V on the rotating elements. When the voltage on the movable micro-elements is shifted to 0 V just before a predetermined signal, which may for example be said electromagnetic radiation signal directed onto said movable micro-element, then all movable micro-elements will take the desired deflection simultaneously. When the electromagnetic radiation impinges on the movable micro-element all capacitors connected to the address electrodes on the substrate will be discharged and the movable micro-elements will immediately return to the undeflected and electrostatically unattracted state. In this way the duty-cycle for deflecting any movable micro-element can be kept very small depending on the switch time of the mirror voltage. If Δt+Δt' is kept at 10 microseconds, then the duty-cycle for fully deflected state will be 1% if a frequency of the pulsed signal is 1000 Hz.

When the address electrode is addressed to the maximum or minimum (ground) potential and the movable micro-element is set to half the value of the maximum potential and the counter electrode is kept at ground potential the movable micro-element is undeflected and unaddressed. For each value between said maximum and minimum potential said movable micro-element will be deflected and unaddressed. The worst case is an address voltage being half the value of the maximum value. In this case there is no force between the address electrode and the movable micro-element since they are both at 10 V. The counter electrode is then pulling the movable micro-element down with a force corresponding to 10 V. This deflection is fortunately however relatively small due to the non-linear behavior of the movable micro-element as can be seen from FIG. 3.

Figure 4:
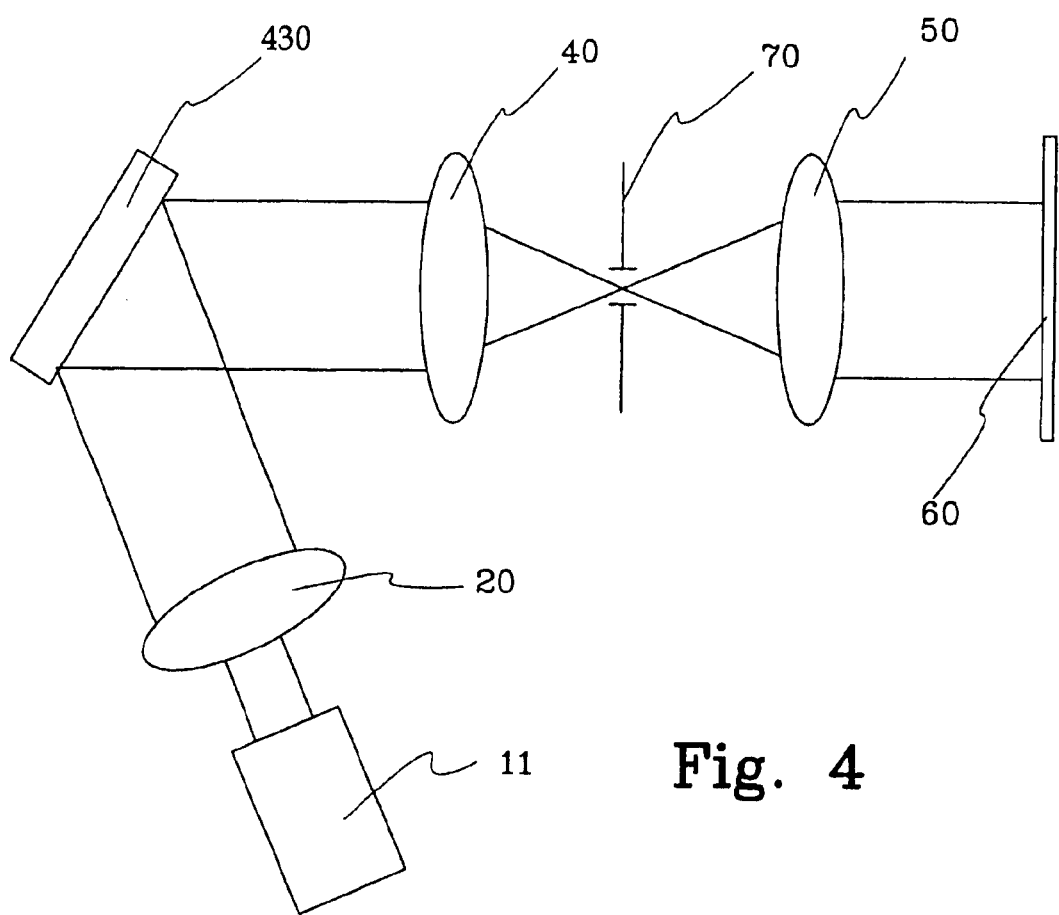
FIG. 4 shows an optical system for patterning a substrate coated with a layer of electromagnetic radiation sensitive material.

FIG. 4 shows an embodiment of an apparatus 100 for patterning a work piece 60 coated with a layer of an electromagnetical radiation sensitive material. Said apparatus 100 comprises a source 11 for emitting electromagnetic radiation, a first lens arrangement 50, a computer controlled reticle 30, a second lens arrangement 20, a spatial filter 70, a third lens arrangement 40 and a work piece 60.

The source 11 may emit radiation in the range of wavelengths from infrared (IR), which is defined as 780 nm up to about 20 μm, to extreme ultraviolet (EUV), which in this application is defined as the range from 100 nm and down as far as the radiation is possible to be treated as electromagnetic radiation. The source 11 emits radiation either pulsed or continuously. The emitted radiation from the continuous radiation source 11 can be formed into a pulsed radiation by means of a shutter located in the radiation path between said radiation source 11 and said computer controlled reticle 30. As an example can the radiation source 11 be a KrF excimer laser with a pulsed output at 248 nm, a pulse length of approximately 10 ns and a repetition rate of 1000 Hz. The repetition rate may be below or above 1000 Hz.

The second lens arrangement 20 may be a simple lens or an assembly of lenses. The second lens arrangement 20 distributes the radiation emitted from the radiation source 11 uniformly over a surface of the computer controlled reticle 30.

The second lens arrangement 20 may have its exit pupil at infinity, which means that central axis of cones of radiation are parallel. Said object plane coincides with the position of the computer-controlled reticle 30 and in this embodiment said central axis of cones of radiation are parallel in said object plane. The computer-controlled reticle 30 may be a Spatial Light Modulator (SLM). In this embodiment the SLM comprises all information at a single moment that is required to pattern the whole workpiece 60.

Spatial light modulators 30 may be based on reflection or transmission. In the embodiment as shown in FIG. 1 the SLM is a reflective SLM. Reflective Spatial Light modulators come in two varieties, the deflection type and the phase type. The differences between them may in a particular case with micromirrors seem small, but the phase SLM extinguishes the beam in the specular direction by destructive interference, while a pixel in a deflection SLM deflects the specular beam geometrically to one side so that it misses the aperture of the imaging lens. Typically, the micromirrors in a deflection SLM move more out of a flat position defined by the surface of a relaxed SLM, where the surface of the micromirrors is flat, compared to the micromirrors in a phase SLM. For ultra precise patterning as performed in the current invention the phase SLM is superior to the deflecting type.

First, it has better contrast since all parts of the surface, also hinges and support posts, take part in the destructive interference and total extinction can be achieved.

Second, a system that works by deflecting the radiation to the side is difficult to make symmetric around an optical axis at intermediate deflection angles, creating a risk of feature instability when focus is changed. The phase SLM can be built with micro machined mirrors, so called micromirrors, or with a continuous mirror surface on a supporting substrate, where said mirror surface is possible to deform by using an electronic signal.

For example, said continuous mirror may use a visco elastic layer controlled by an electrostatic field, but it is equally possible, especially for very short wavelengths where deformations of the order of a few nanometers are sufficient, to use a piezoelectric solid disk that is deformed by electric field or another electrically, magnetically or thermally controlled reflecting surface. For the remainder of this application an electrostatically controlled micro-mirror matrix (one- or two dimensional) is assumed, although other arrangements as described above are possible, such as transmissive or reflective SLMs relying on LCD crystals or electro optical materials as their modulation mechanism, or micro-mechanical SLMs using piezoelectric or electrostrictive actuation.

The SLM is a programmable device that produces an output radiation beam that is modulated by separate inputs from a computer. The SLM simulates the function of a mask through the generation of bright and dark pixels in response to computer fed data. For example the phase SLM is an array of etched solid-state mirrors. Each micro-mirror element is suspended above a silicon substrate by torsion hinges, which may be supported either by separate support posts or by the adjacent mirrors. Beneath the micro-mirror element are address electrodes. One micro-mirror represents one pixel in the object plane. The pixel in the image plane is here defined as to have the same geometry as the micro-mirror but the size may be different due to the optics, i.e. larger or smaller depending on if the optics is magnifying or de-magnifying.

The micro-mirror and the address electrodes act as a capacitor so that a voltage applied to the address electrode, with respect to a voltage to the micro-mirror, will twist the torsion hinges suspending the micro-mirror which in turn allow the micro-mirror to rotate, thereby creating a phase difference. Depending on the voltage applied the rotation of the micro-mirror may take any state between flat to fully rotated position. A fully rotated micro mirror having an essentially square surface with its sides approximately 16 $\mu$m long is typically 8 mRad. More generally the fully rotated micro-mirror will rotate one quarter of the wavelength used, measured at the edges parallel to the rotation axis or with micromirrors with orthogonal movement with respect to the surface the difference between max and min state is one quarter of the wavelength used, measured parallel with a surface of said micro-mirror.

A projection system 80 comprises in this embodiment the third lens arrangement 40, a spatial filter 70 and the first lens arrangement 50. The third lens arrangement 40 and the spatial filter 70 forms together what is generally called a Fourier filter.

The spatial filter 70 is in this embodiment an aperture in a plate. Said aperture being sized and positioned so as to block out essentially every diffraction order which is diffracted into the first and higher diffraction orders, for example said aperture may be located at the focal distance from the third lens arrangement 40. The reflected radiation is collected by said third lens arrangement 40 in the focal plane, which acts at the same time as a pupil plane of the first lens arrangement 50. The aperture cuts out the light from the first and higher diffraction orders of the addressed micromirrors in the SLM, while the radiation from the non-addressed mirror surfaces can pass the aperture. The result is intensity modulated aerial image on the work piece 60 as in conventional lithography. For an optimum image contrast the diffraction pattern of an SLM with all pixels deflected should only contain light in the first and higher diffraction orders without any radiation in the zeroth order.

The first lens arrangement 50 has in this embodiment its exit pupil at infinity, i.e. central axis of cones of radiation in a image plane defined by the position of the work piece 60 are parallel.

The work piece 60 may be a substrate with a photosensitive surface, such as a photo mask for semiconductor devices and display panels. It may also be semi-conducting wafer coated with a photosensitive layer. Since the present invention not only have applications in direct patterning of semiconductor device patterns, display panels, integrated optical devices and electronic interconnect structures, it can also have applications to other types of patterning such as security patterning. The term patterning should be understood in a broad sense, meaning exposure of photo resist and photographic emulsion, but also the action of radiation on other radiation sensitive media such as dry process paper, by ablation or chemical processes activated by radiation or heat. The present invention may also find application in wafer repairing, wherein a processed wafer is reprocessed with the radiation beam.

The work piece 60 may also rest on a moving stage, which moves at a constant velocity. The electromagnetic radiation is in said case a pulsed electromagnetic source 11 where each pulse that illuminates the computer controlled reticle 30 and is imaged onto the work piece 60 will illuminate a different part of the work piece 60. The computer-controlled reticle 30 which for example may be a SLM operates so that the entire array of micromirrors can be reconfigured for each pulse to form the correct image on the work piece 60.

At first, binary pattern from a CAD layout is transformed into a data set of SLM data. The data is transferred to the SLM, where the built in control electronics causes a number of micromirrors to change position. Thereby, the non-deflected pixels represent bright regions on the work piece. Every cone of radiation in a specific image pixel as defined previously in said image plane corresponds to a specific object pixel in said computer controlled reticle 30, which for example may be a single micromirror. Each micromirror may be of the type of movable micro-element as described hereinabove.

A pattern on a work piece 60 is created by a number of SLM stamps. Said stamps may be partially overlapping each other. Said stamps may be grouped together in strips, where each strip comprises at least two stamps and covers the full length of a mask substrate or a portion of it. Said stamps in a strip are arranged in a one-dimensional line, for example a row or a column of stamps.

Figure 5:
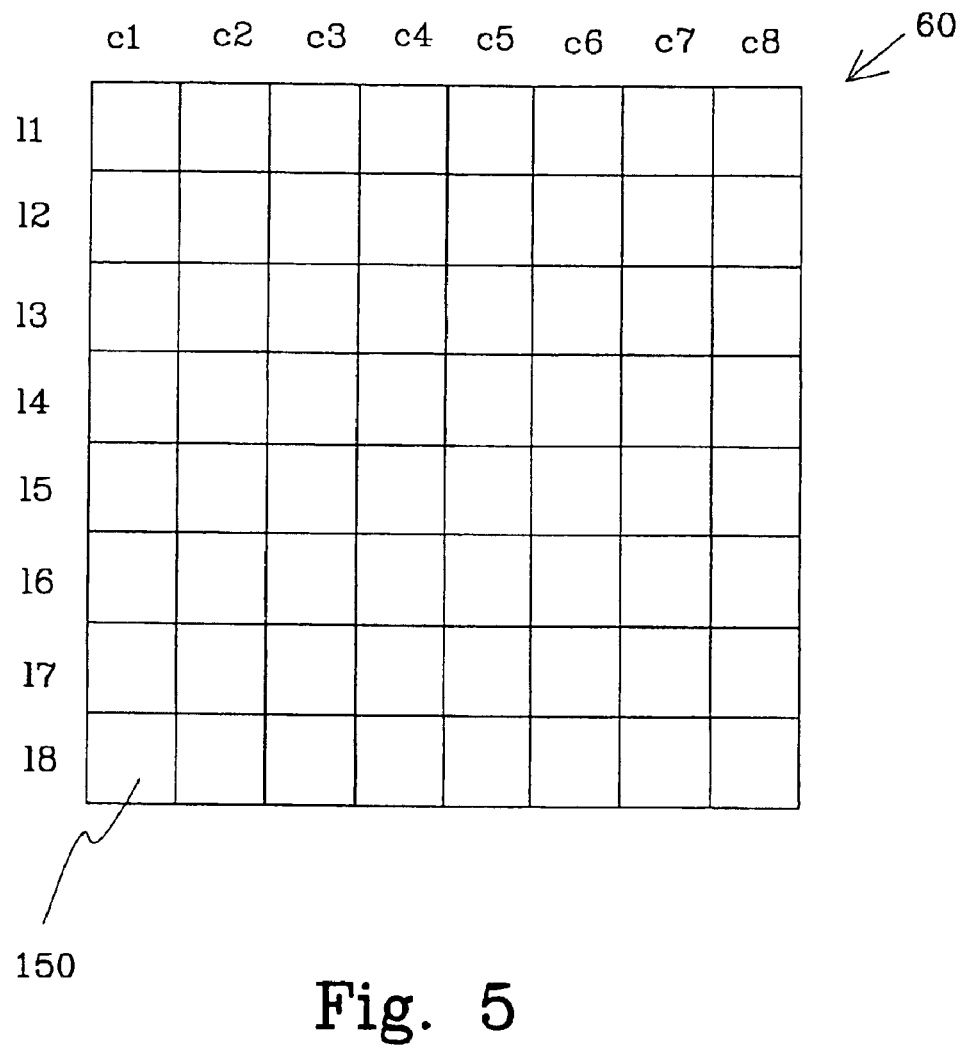

FIG. 5 illustrates an example of how SLM stamps 150 are arranged on a workpiece 60. In said figure the workpiece 60 is covered by 8 lines 11, 12, 13, 14, 15, 16, 17, 18 and 8 columns c1, c2, c3, c4, c5, c6, c7, c8 of SLM stamps 150. In reality a workpiece is covered with several thousands of SLM stamps but for reason of clarity only an 8×8 pattern is illustrated. An individual stamp comprises a large number of pixels, typically in the order of million pixels. A strip may be a complete line 11, 12, 13, 14, 15, 16, 17, 18 or a portion of such a line. A support structure, which carries the workpiece, is moving along a direction of a strip, for example along a line 11, 12, 13, 14, 15, 16, 17, 18 while the radiation source flashes radiation onto the SLM for imaging the pattern thereon to the workpiece. After having finished a strip, the support structure is moved in a direction essentially perpendicular to the direction of a strip and a distance essentially equal to a size of a stamp in said direction.

Imprinting is a cumulative material effect, which manifest itself by a gradually increased change of the actuator/pixel position when all parameters are kept constant in the deflected state. It further manifests itself by more or less curing out when the actuator is left in the non-deflected state for a sufficient amount of time. Both building up imprinting and curing out imprinting are non-linear effects. The position at a given time thus depends not only on the electrostatic force the actuator is experiencing at that time, but also on the history of deflection of this particular actuator. Therefore, the response of the actuator becomes inaccurate after a given period of time, i.e. the placement accuracy of features on the mask in the lithography process is reduced.

In another embodiment according to the invention said imprinting is completely or at least substantially reduced.

During the time period of processing a complete pattern on a workpiece, there may be time intervals, which are longer than the time between two laser flashes, when no pattern is generated. During the return stroke, which is the time it takes for the support structure to move from an end of a finished strip to a beginning of another strip, the laser does not illuminate the SLM. During the return stroke the pattern on the SLM is not affecting the final pattern on the mask. It is therefore possible to operate the SLM in any way desired to reduce or neutralize the cumulative imprinting effect from stripe to stripe during the time of a return stroke.

When printing a specific pattern on a work piece the time of deflection and the degree of deflection for each individual pixel may be monitored during each strip. Counteraction of imprinting during for example the return stroke can be achieved by shifting each actuator in a reversed or negative state. This may be done using amplitude and address time, or a set of amplitudes and address times, individually for each actuator in the SLM, which exactly inhibits the imprinting induced during the previous strip(s) exposure(s).

It is further possible to use a feed back system in which the momentaneous imprinting induced for each actuator is monitored and thereafter cancelled. This can be done using an in-system camera based monitor system, where the contrast from each actuator is measured when all actuators are addressed to an identical amplitude. The measurements should be done immediately after each strip using a collective address position for the actuators where the contrast derivative is highest possible in the mask writer system. The information from this measurement can then be used to fine tune the amplitude and address time for the imprinting counteraction addressing during the rest of the return stroke.

Instead of using the return stroke as the time period for reducing or canceling the imprinting effects, said cancellation or reduction method may be performed at any time in the processing of a complete pattern. For instance, the imaging procedure may be stopped at any given time when a particular actuator has been in the addressed state for a given time period, where the amount of deflection may or may not be taken into account.

The cancellation of imprinting may be performed in more than one step. After having counteracted the individual actuators for a given time interval, either calculated from information about deflecting time and degree of deflection or from a picture taken by a CCD camera for example, a further fine tuning may be performed out of a picture taken of the imprinting cancelled SLM. Every SLM pixel is set to a given state, and the degree of difference from said state give rise to a further fine adjustment of said actuator or compensation in an addressing function for the individual pixels.

Thus, although there has been disclosed to this point particular embodiments of the apparatus for patterning a work piece, it is not intended that such specific references be considered as limitations upon the scope of this invention except in-so-far as set forth in the following claims. Furthermore, having described the invention in connection with certain specific embodiments thereof, it is to be understood that further modifications may suggest themselves to those skilled in the art, it is intended to cover all such modifications as fall within the scope of the appended claims.

What is claimed is:

1. A movable micro-element (10) with reduced imprinting effect arranged spaced apart from a surface (20) including:
   at least one restoring element (60, 70) connected to said movable micro-element (10),
   at least one address electrode (40) arranged on said surface (20) and operable to electrostatically attract said movable micro-element (10) wherein said address electrode (40) begins at a first potential, is set to a second potential defining a non addressed state before a predetermined pulsed signal is emitted onto said movable micro-element (10), and is switched from said second potential to a third potential defining an addressed state prior to and holding it there during the predetermined pulsed signal.

2. The movable micro-element (10) according to claim 1, wherein said movable micro-element (10) is switched back into said non addressed state after being in said addressed state by switching said third potential back to said second potential.

3. The movable micro-element (10) according to claim 2, wherein said movable microelement is kept at said addressed state for a time period which is shorter than 10 ms.

4. The movable micro-element (10) according to claim 1, wherein said movable micro-element (10) is switched into an electrostatically unattracted state after being in said second potential.

5. The movable micro-element (10) according to claim 4, wherein said predetermined pulsed signal is operable to clear out a potential difference between said address electrode (40) and said movable micro-element (10) and thereby restoring said movable micro-element (10) to said electrostatically unattracted state.

6. The movable micro-element (10) according to claim 1, wherein said predetermined pulsed signal is electromagnetic radiation directed onto said movable micro-element (10).

7. The movable micro-element (10) according to claim 1, wherein said predetermined pulsed signal is an electric signal operable to initiate a discharging of a capacitor connected to said address electrode (40) and loaded with said first potential.

8. The movable micro-element (10) according to claim 1, wherein said movable microelement is kept at said addressed state for a time period which is shorter than 10 ms.

9. The movable micro-element (10) according to claim 8, wherein said predetermined pulsed signal is synchronized with a time period Dt+Dt' so that the time Dt is essentially equal to the pulse length of said predetermined pulsed signal.

10. The spatial light modulator according to claim 9, further including at least one counter electrode (30) arranged on said surface (20) and operable to electrostatically attract said movable micro-element (10) wherein said counter electrodes (30) are set to a potential via a common counter pin.

11. The spatial light modulator according to claim 9, wherein all reflecting elements are in an addressed state for essentially the same period of time.

12. The movable micro-element (10) according to claim 1, wherein a value of said second potential is essentially equal to half a maximum potential addressed to said address electrode (40) and said third potential is essentially equal to said minimum potential addressed to said address electrode (40).

13. The movable micro-element (10) according to claim 1, wherein said movable micro-element (10) is supported along a mid section by a pair of torsion hinges (60) defining a torsional axis.

14. The movable micro-element according to claim 13, further comprising at least one flexure hinge operable to restore said movable micro-element in an undeflected state but at the same time permitting said movable micro-element (10) to tilt around said tilting or torsional axis.

15. The movable micro-element (10) according to claim 13, wherein at least one of said flexure hinges (70) and/or at least one of said torsional axis is meander shaped.

16. The movable micro-element (10) according to claim 1, wherein said movable micro-element (10) is supported along a mid section by a pair of pivot elements (65) defining a tilting axis and where said restoring element is at least one flexure hinge (70) operable to restore said movable micro-element (10) in an undeflected state but at the same time permitting said movable micro-element (10) to tilt around said tilting axis.

17. The movable micro-element (10) according to claim 1, wherein said movable micro-element (10) is supported along one of its mid sections by a pair of flexure hinges (70) operable to restore said movable micro-element (10) to a relaxed state but at the same time permitting said movable micro-element (10) to make an orthogonal movement with respect to said surface (20).

18. The movable micro-element (10) according to claim 17, wherein said flexure hinges (70) are attached to the corners of a polygon-shaped movable micro-element (10).

19. The movable micro-element according to claim 17, wherein said flexure hinges (70) are attached to the sides of a polygon-shaped movable micro-element (10).

20. The movable micro-element (10) according to claim 1, wherein said movable micro-element (10) is supported along two mid sections by two pairs of flexure hinges (70) operable to restore said movable micro-element (10) to a relaxed state but at the same time permitting said movable micro-element (10) to make an orthogonal movement with respect to said surface (20).

21. The movable micro-element (10) according to claim 1, wherein said surface (20) further comprising a counter electrode (30) laterally spaced apart from said address electrode (40) where said address electrode (40) and said counter electrode (30) are operable to electrostatically attract said micro-element (10).

22. The movable micro-element (10) according to claim 21, wherein said predetermined pulsed signal is operable to clear out a potential difference between said address electrode (40) and said counter electrode (30), thereby restoring said movable micro-element (10) to said non addressed state.

23. The movable micro-element (10) according to claim 22, wherein said predetermined pulsed signal is electromagnetic radiation directed onto said movable element (10).

24. The movable micro-element (10) according to claim 22, wherein said predetermined pulsed signal is an electric signal adapted to discharge a capacitor connected to said address electrode (40) and loaded with said first potential.

25. The movable micro-element (10) according to claim 21, wherein said predetermined pulsed signal is operable to clear out a potential difference between said address electrode (40) and a counter electrode (30) and thereby restoring said movable element (10) to an electrostatically unattracted state.

26. A spatial light modulator having a plurality of reflecting elements, wherein said reflecting elements are movable micro-elements (10) according to claim 1.

27. The spatial light modulator according to claim 26, wherein said reflecting elements are set to a potential via a common element pin.

28. An apparatus for patterning a workpiece (60) arranged at an image plane and sensitive to electromagnetic radiation, comprising:
a source (11) emitting electromagnetic radiation directed onto an object plane,
a computer controlled reticle (30) comprising a plurality of reflecting elements, adapted to receive said electromagnetic radiation at said object plane and to relay said electromagnetic radiation toward said work piece (60) arranged at said image plane, where said computer controlled reticle (30) comprising a plurality of reflecting elements wherein said reflecting elements are movable micro-elements according to claim 1.

29. A method of reducing an imprinting effect of a movable micro-element arranged spaced apart from a surface, wherein said surface comprises at least one electrode and the movable micro-element begins at a first potential, including:
setting said movable micro-element to a second potential defining a non addressed state,
switching said movable micro-element from said second potential to a third potential, defining an addressed state, before a predetermined pulsed signal is emitted,
releasing the moveable micro-element from the addressed state after the predetermined pulsed signal.

30. The method according to claim 29, wherein the releasing step includes:
switching said micro-element from said third potential back to said second potential.

31. The method according to claim 29, wherein the releasing step includes:
switching said movable micro-element into an electrostatically unattracted state after being in said addressed state.

32. The method according to claim 31, wherein the releasing step includes:
clearing out a potential difference between said address electrode and said movable micromirror by means of said predetermined pulsed signal and thereby restoring said movable element to said electrostatically unattracted state.

33. The method according to claim 29, wherein said predetermined pulsed signal is an electromagnetic radiation signal directed onto said movable micro-element.

34. The method according to claim 29, wherein said predetermined pulsed signal is an electric signal adapted to initiate a discharging of a capacitor connected to said address electrode and loaded with said first potential.

35. The method according to claim 29, wherein said movable microelement is kept at said addressed state for less than 10 ms.

36. The method according to claim 35 further comprising the action of:
synchronizing said predetermined pulsed signal with said time period Dt+Dt' so that the time Dt' is essentially equal to the pulse length of said predetermined signal.

37. The method according to claim 29, wherein a value of said second potential is essentially equal to half a maximum potential addressed to said address electrode defining an undeflected state at both the maximum and a minimum potential addressed to said address electrode and said third potential is essentially equal to said minimum potential addressed to said address electrode.

38. The method according to claim 29, further comprising the action of:
supporting said movable micro-element along a mid section by a pair of torsion hinges defining a torsional axis.

39. The method according to claim 29, further comprising the action of:
supporting said movable micro-element along its mid section by a pair of pivot element defining a tilting axis and where said restoring element is at least one flexure hinge operable to restore said movable micro-element in an undeflected state but at the same time permitting said movable micro-element to tilt around said tilting axis.

40. The method according to claim 39, further comprising the action of:
restoring said movable micro-element with at least one flexure hinge.

41. The method according to claim 39, wherein at least one of said flexure hinges and/or at least one of said torsional axis is meander shaped.

42. The method according to claim 29, further comprising the action of:
supporting said movable micro-element along one of its mid sections by a pair of flexure hinges which are operable to restore said movable micro-element to a relaxed state but at the same time permitting said movable micro-element to make an orthogonal movement with respect to said surface comprising said at least one electrode.

43. The method according to claim 29, further comprising the action of:

supporting said movable micro-element along two mid sections by a pair of flexure hinges operable to restore said movable micro-element to a relaxed state but at the same time permitting said movable micro-element to make an orthogonal movement with respect to said surface comprising said at least one electrode.

44. The method according to claim 43, wherein said flexure hinges are attached to the corners of a polygon.

45. The method according to claim 43, wherein said flexure hinges are attached to the sides of a polygon.

46. The method according to claim 29, where said movable micro-element is a movable micro-element.

47. The method according to claim 29, further comprising the action of:

neutralizing cumulated imprinting effects.

48. The method according to claim 47, wherein said neutralizing action is performed by deflecting individual movable micro element in a reverse direction compared to the way they are deflected during intended operation.

49. The method according to claim 47, wherein individual movable micro elements are deflected in a first direction a given time and a given degree of deflection depending on the cumulated time and degree of deflection in a second deflection direction.

50. The method according to claim 47, wherein said neutralizing of said cumulated imprinting effects are performed between different strips building up a complete pattern on a workpiece.

51. The method according to claim 47, wherein said neutralizing of said cumulated imprinting effects is performed after at least one movable micro element has been deflected a predetermined cumulated time period.

52. The method according to claim 29, wherein said movable microelement is kept at said addressed state for less than 10 ms.

53. A method of reducing an imprinting effect of a movable micro-element arranged spaced apart from a surface, wherein said surface includes at least one address electrode operable to electrostatically attract said movable microelement, the method including:

addressing said address electrode to a first potential, setting said movable microelement to a second potential defining a non-addressed state, switching said movable micro-element from said second potential to a third potential, defining an addressed state, before a predetermined pulsed signal is emitted, thereby reducing an addressed state duty cycle of said movable element.

54. The method according to claim 53, further including:

switching said micro-element from said third potential back to said second potential after the predetermined pulse is emitted.

55. The method according to claim 53, further including:

switching said movable micro-element into an electrostatically unattracted state after being in said addressed state.

56. The method according to claim 55, further including:

clearing out a potential difference between said address electrode and said movable micromirror by applying said predetermined pulsed signal and thereby restoring said movable element to said electrostatically unattracted state.

* * * * *